United States Patent
Whitesell et al.

(10) Patent No.: US 9,227,543 B2
(45) Date of Patent: Jan. 5, 2016

(54) TEXTILE STRUCTURE WITH IMPROVED BACKING

(75) Inventors: Kenneth Mitchell Whitesell, Troy, NC (US); Ernest Franklin Wilson, Albemarle, NC (US); Sean Bracken Simmons, Concord, NC (US)

(73) Assignee: International Automotive Components Group North America, Inc., Southfield, MI (US)

( * ) Notice: Subject to any disclaimer, the term of this patent is extended or adjusted under 35 U.S.C. 154(b) by 573 days.

(21) Appl. No.: 13/525,692

(22) Filed: Jun. 18, 2012

(65) Prior Publication Data

US 2012/0321877 A1    Dec. 20, 2012

Related U.S. Application Data

(60) Provisional application No. 61/497,770, filed on Jun. 16, 2011.

(51) Int. Cl.
*B60N 3/04*    (2006.01)
*D06N 7/00*    (2006.01)
(Continued)

(52) U.S. Cl.
CPC ............ *B60N 3/044* (2013.01); *B60N 3/046* (2013.01); *B60N 3/048* (2013.01); *D06N 7/0081* (2013.01); *B29L 2031/3017* (2013.01); *B29L 2031/7324* (2013.01); *D06N 2209/106* (2013.01); *Y10T 29/49826* (2015.01); *Y10T 428/249921* (2015.04); *Y10T 428/26* (2015.01); *Y10T 428/273* (2015.01); *Y10T 442/59* (2015.04); *Y10T 442/60* (2015.04)

(58) Field of Classification Search
CPC .............. D06N 7/0071; D06N 7/0081; D06N 2211/261; D06N 2209/106; B29L 2031/3017; B29L 2031/7324; B60N 3/04; B60N 3/044; B60N 3/046; B60N 3/048
USPC ................................................. 428/95, 212, 89
See application file for complete search history.

(56) References Cited

U.S. PATENT DOCUMENTS 3,922,454 A * 11/1975 Roecker ................. D05C 17/02
                                                                        156/60
4,131,704 A * 12/1978 Erickson et al. .................. 428/95
4,258,094 A *  3/1981 Benedyk .......................... 428/85
(Continued)

FOREIGN PATENT DOCUMENTS

DE    EP 1325845 A2 *  7/2003 ............. B60R 13/02
DE    EP 2475813 B1 * 10/2013 ................. B32B 5/26
(Continued)

*Primary Examiner* — Cheryl Juska
(74) *Attorney, Agent, or Firm* — Grossman, Tucker, Perreault & Pfleger, PLLC

(57) ABSTRACT

A textile structure is provided which comprises a backing of at least a first plurality of fibers and a second plurality of fibers, wherein the first plurality of fibers have a first fiber denier and the second plurality of fibers have a second fiber denier different than the first fiber denier. A method of providing a slip resistant covering to overlie a floor pan carpet of a motor vehicle is provided comprising overlying the carpet with an accessory mat having an underlying backing comprising at least a first plurality of fibers and a second plurality of fibers, wherein the first plurality of fibers have a first fiber denier and the second plurality of fibers have a second fiber denier different than the first fiber denier, and wherein the underlying backing of the accessory mat is configured to be in direct contact with the floor pan carpet.

14 Claims, 3 Drawing Sheets

(51) Int. Cl.
 *B29L 31/30* (2006.01)
 *B29L 31/00* (2006.01)

(56) References Cited

U.S. PATENT DOCUMENTS

| | | | | |
|---|---|---|---|---|
| 4,361,610 A | * | 11/1982 | Roth | B60N 3/044 296/97.23 |
| 4,481,240 A | * | 11/1984 | Roth | B60N 3/044 296/97.23 |
| 4,673,603 A | * | 6/1987 | Roth | B60N 3/044 296/97.23 |
| 4,820,566 A | * | 4/1989 | Heine | D05C 17/026 428/88 |
| 4,822,658 A | * | 4/1989 | Pacione | A47G 27/0437 428/100 |
| 5,049,429 A | * | 9/1991 | Shibukawa | D06C 11/00 156/296 |
| 5,055,333 A | * | 10/1991 | Heine | D05C 17/026 428/212 |
| 5,380,574 A | * | 1/1995 | Katoh | A47G 27/0412 428/92 |
| 5,472,763 A | * | 12/1995 | Schwarz et al. | 428/95 |
| 5,630,896 A | * | 5/1997 | Corbin et al. | 156/72 |
| 5,654,066 A | * | 8/1997 | Pacione | D06N 7/0086 428/100 |
| 6,060,145 A | * | 5/2000 | Smith | B32B 5/06 428/95 |
| 6,258,202 B1 | * | 7/2001 | Callas | 156/293 |
| 6,344,254 B1 | * | 2/2002 | Smith | B32B 5/06 428/95 |
| 6,468,622 B1 | * | 10/2002 | Combs | A47L 23/266 15/215 |
| 7,527,847 B2 | * | 5/2009 | Roding | B60R 13/02 428/92 |
| 7,537,818 B2 | * | 5/2009 | Allison | B32B 3/10 428/131 |
| 7,884,038 B2 | * | 2/2011 | Roding | B60R 13/02 428/85 |
| 8,322,487 B1 | * | 12/2012 | Kitchen et al. | 181/294 |
| 8,407,869 B2 | * | 4/2013 | Imaizumi | A47G 27/0412 156/250 |
| 2002/0006495 A1 | * | 1/2002 | Vinod | A47G 27/0243 428/89 |
| 2006/0057328 A1 | * | 3/2006 | Pacione | A47G 27/0475 428/95 |
| 2006/0093781 A1 | * | 5/2006 | Kuroda | D03D 27/00 428/89 |
| 2006/0275630 A1 | * | 12/2006 | Roding | B60R 13/02 428/105 |
| 2007/0036979 A1 | * | 2/2007 | Roding | B60R 13/02 428/411.1 |
| 2007/0269631 A9 | * | 11/2007 | Pacione | A47G 27/0475 428/95 |
| 2007/0275180 A1 | * | 11/2007 | Thompson et al. | 427/559 |
| 2008/0268216 A1 | * | 10/2008 | Quincy et al. | 428/212 |
| 2011/0244173 A1 | * | 10/2011 | Yang | B32B 5/02 428/92 |
| 2012/0235438 A1 | * | 9/2012 | Roding | B32B 5/26 296/97.23 |

FOREIGN PATENT DOCUMENTS

| | | | | |
|---|---|---|---|---|
| WO | WO 2005049913 A1 | * | 6/2005 | B32B 5/02 |
| WO | WO 2006005625 A1 | * | 1/2006 | B60N 3/044 |
| WO | WO 2011029736 A1 | * | 4/2011 | B32B 5/26 |

* cited by examiner

TEXTILE STRUCTURE WITH IMPROVED BACKING

CROSS REFERENCE TO RELATED APPLICATIONS

The present application claims the benefit of the filing date of U.S. Provisional Application Ser. No. 61/497,770, filed Jun. 16, 2011, the teachings of which are incorporated herein by reference.

FIELD OF THE INVENTION

The present disclosure relates to a textile structure, such as a localized area mat, with an improved backing and, more particularly a backing which, when placed over a carpet, may provide increased slip/slide resistance between the textile structure and carpet.

BACKGROUND

Automotive accessory mats, such as floor mats for the passenger floor area (e.g. front passenger or rear passenger floor mats) and/or the cargo area of a motor vehicle (e.g. trunk or other storage area), may overlie the interior carpeted area of a motor vehicle, particularly in localized areas of the carpet prone to high wear, to better inhibit wear of those carpeted areas.

For example, automotive floor mats, which also may be referred to as throw-in-mats, may be positioned beneath the feet of vehicle passengers to collect dirt, sand and other debris which separates from passenger's shoes. In this manner, damage to the underlying carpet may be reduced and confined to the floor mats. This may reduce the need to replace the underlying carpet which may be costly as the seats, console and other interior rim components may have to be removed prior to replacing the carpet, and then replaced once again. On the other hand, once a floor mat is worn, the floor mat may simply be removed from the vehicle and replaced without a need to remove other interior trim components.

Automotive floor mats may be completely made of a molded polymer, such a rubber mat. Other floor mats may be made of a tufted carpet with a rubber backing which may include molded protrusions, which may be commonly referred to as nibs.

The molded protrusions are designed to inhibit the mat from sliding or otherwise moving out of its desired predetermined position, particularly when a shear load is applied to the surface of the mat. In other words, a transitional load which creates shear stress or lateral movement between the automotive floor mat and the carpet. In this manner, safety may be increased by providing a floor mat less prone to slide, for example under the operating pedals (e.g. accelerator, brake, clutch) of the vehicle and cause disruption.

More recently, automotive manufactures have sought to reduce the weight of floor mats while at the same time increasing a resistance to lateral movement of the floor mats over the carpet.

SUMMARY

The present disclosure provides a lightweight textile backing to a floor covering, which may be particularly used as an automotive accessory mat (e.g. floor mat), and which also may provide increased (frictional) resistance to lateral movement when overlying and contacting another individual floor covering, such as a larger area carpet or other textile.

In certain embodiments, the present disclosure may provide a planar floor covering comprising an upper layer, and a lower textile layer which provides the backing layer, and more particularly the bottom layer, of the floor covering. The backing layer may comprise a non-woven backing having fibers of at least two different deniers.

In certain embodiments, the present disclosure may provide a textile structure comprising an upper layer, a primary backing underlying the upper layer and a secondary backing underlying the primary backing, wherein the secondary backing comprises at least a first plurality of fibers and a second plurality of fibers, wherein the first plurality of fibers have a first fiber denier and the second plurality of fibers have a second fiber denier different than the first fiber denier.

The first plurality of fibers may have a first fiber denier in a range of 2 to 40 denier, and be provided between 20% to 70% by weight of a total fibers of the secondary backing. The second plurality of fibers may have a second fiber denier in a range of 30 to 500 denier, and be provided between 30% to 80% by weight of the total fibers of the secondary backing.

In certain embodiments, the present disclosure may also provide a covering to overlie an interior floor of a motor vehicle comprising an accessory mat, wherein the mat has an underlying backing comprising at least a first plurality of fibers and a second plurality of fibers, wherein the first plurality of fibers have a first fiber denier and the second plurality of fibers have a second fiber denier different than the first fiber denier. The covering may further comprise a floor pan carpet which underlies the accessory mat, and the underlying backing of the accessory mat may directly overlie the floor pan carpet.

In certain embodiments, the present disclosure may also provide a method of providing a slip resistant covering to overlie a floor pan carpet of a motor vehicle comprising overlying the carpet with an accessory mat having an underlying backing comprising at least a first plurality of fibers and a second plurality of fibers, wherein the first plurality of fibers have a first fiber denier and the second plurality of fibers have a second fiber denier different than the first fiber denier, and wherein the underlying backing of the accessory mat is configured to be in direct contact with the floor pan carpet.

FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
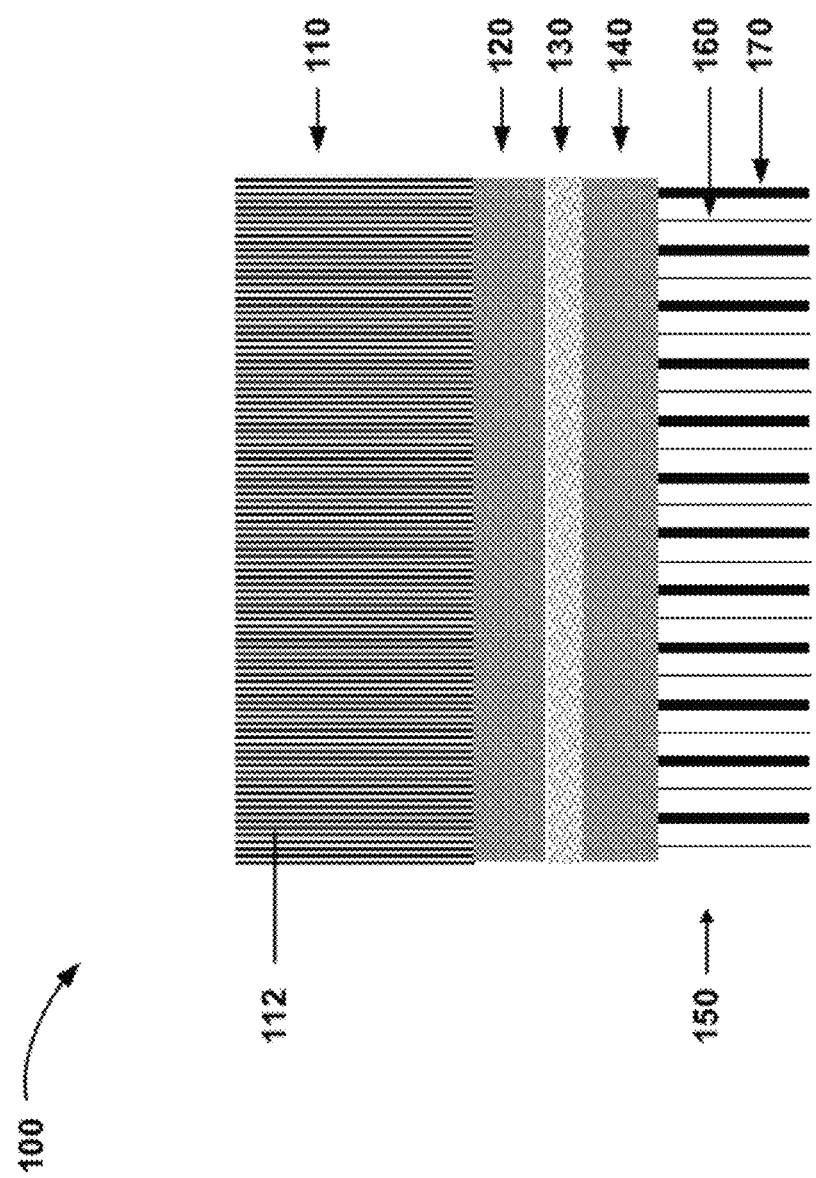
FIG. 1 is an illustration of a textile structure according to the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring to FIG. 1, there is illustrated a planar textile structure 100, which may comprise a tufted product such a tufted carpet. As shown, textile structure 100 may comprise an upper layer 110, which may also be a cosmetic or decorative outer layer. Upper layer 110 may be made of a plurality of face yarns 112, natural or synthetic, in the form of tufts which provide a pile, which may be cut or loop (uncut). Upper layer may have a pile (face) weight in a range of and all increments between 9 oz/yd$^2$ to 80 oz/yd$^2$ (ounces/square yard) and a carpet pile height in a range of and all increments between 2 mm to 25 mm (millimeters).

Yarns 112 may be tufted with primary backing layer 120. Primary backing layer 120 may be a woven or non-woven fabric, and may be made from, for example, polypropylene, polyester and nylon as well as combinations of one or more polymers (e.g. nylon and polyester).

After yarns 112 are inserted in the primary backing 120 by tufting, a binding agent layer 130, such as a liquid latex coating, may be applied to a backstitch, such as by spray coating, to lock the tufts in place. Additional binding agents may include styrene-butadiene rubber, acrylic and ethylene-vinyl-acetate.

An adhesive layer 140, such as a spray coating, adhesive web or extruded film (e.g. polyethylene film), may be applied to the back of the binding agent 130 to bond a secondary (bottom) backing layer 150 to the remainder of textile structure 100. Layer 140 may also be made of polypropylene, and ethylene-vinyl-acetate, and may include filler materials.

Secondary backing layer 150 may be a non-woven backing comprising discrete fibers 160 and 170 with each having a different denier. Fibers 160, 170 may be filament fibers or staple fibers. As used herein, a filament fiber may be understood to include a fiber of indefinite or extreme length such as found naturally in silk, or manufactured such as by extrusion. As used herein, a staple fiber may be understood to include natural fiber or cut length manufactured fiber from a filament.

Filament and staple fiber may be provided in the form of yarn. Filament fibers may be provided from filament yarn. As used herein, a filament yarn includes a yarn composed of a number of filaments laid together with or without a twist. Staple fibers may be provided from spun yarn. As used herein, a spun yarn includes a yarn composed of a number of staple fibers twisted together.

As used herein, denier refers to denier per individual fiber (dpf). In other words, the denier of an individual continuous filament fiber or an individual staple fiber if it were continuous, both of which may be referred to as a single strand. In filament or spun yarns, the denier per individual fiber may be understood as the yarn denier divided by the number of filament or staple fibers, respectively.

Fibers 160 may be fibers having a range of and all increments between 2 to 40 denier, which may make up a range of and all increments between 20% to 70% by weight of the fibers of secondary backing 150. Fibers 170 may be fibers having a range of and all increments between 30 to 500 denier, which may make up a range of and all increments between 30% to 80% by weight of the fibers of secondary backing 150. With fibers 160, 170 of the foregoing deniers, the minimum denier difference between the two fibers 160, 170 may be at least 28 denier (30 denier minus 2 denier).

More particularly, in other embodiments, fibers 160 may be fibers having a range of and all increments between 2 to 25 denier. Fibers 170 may be fibers having a range of and all increments between 40 to 300 denier. Even more particularly, fibers 160 may be fibers having a range of and all increments between 2 to 15 denier (e.g. 6 denier), and fibers 170 may be fibers having a range of and all increments between 40 to 150 denier (e.g. 70 denier). When fibers 160 have a 6 denier and fibers 170 have a 70 denier, the minimum denier difference between the two fibers 160, 170 may be understood to be 64 denier (70 denier minus 6 denier).

It may be understood that when secondary backing 150 only includes two fibers 160, 170 of different deniers (as opposed to more than two), the two fibers 160, 170 may be understood to provide 100% by weight of the fibers of secondary backing 150 as shown in the following Table 1.

| Group 1 Fibers 160 % by weight | Group 2 Fibers 170 % by weight |
| --- | --- |
| 20 | 80 |
| 25 | 75 |
| 30 | 70 |
| 35 | 65 |
| 40 | 60 |
| 45 | 55 |
| 50 | 50 |
| 55 | 45 |
| 60 | 40 |
| 65 | 35 |
| 70 | 30 |

The fibers 160 and 170 may particularly be made of polypropylene, polyester, polypropylene, nylon as well as combinations of one or more polymers and may include recycle content.

The lengths of fibers 160 and 170 may be the same or different. Fibers 160 and 170 may have lengths of and all increments between 10 mm to 100 mm (millimeters). Fibers 160 and 170 may more particularly have lengths of and all increments between 50 mm to 80 mm.

More particularly, when secondary backing layer 150 is a non-woven backing, secondary backing 150 may be a non-woven felt made with fibers 160 and 170 of different deniers which is processed using a structural needling loop such as a random dilour. The non-woven felt generally may have a weight in a range of and all increments between 4 oz/yd$^2$ to 30 oz/yd$^2$ (ounces/square yard), but could exceed 30 oz/sq yd. More particularly, the non-woven felt may have a weight in a range of and all increments between 6 oz/yd$^2$ to 25 oz/yd$^2$, and even more particularly a weight in a range of and all increments between 8 oz/yd$^2$ to 20 oz/yd$^2$ (e.g. 12 oz/yd$^2$).

Figure 2:
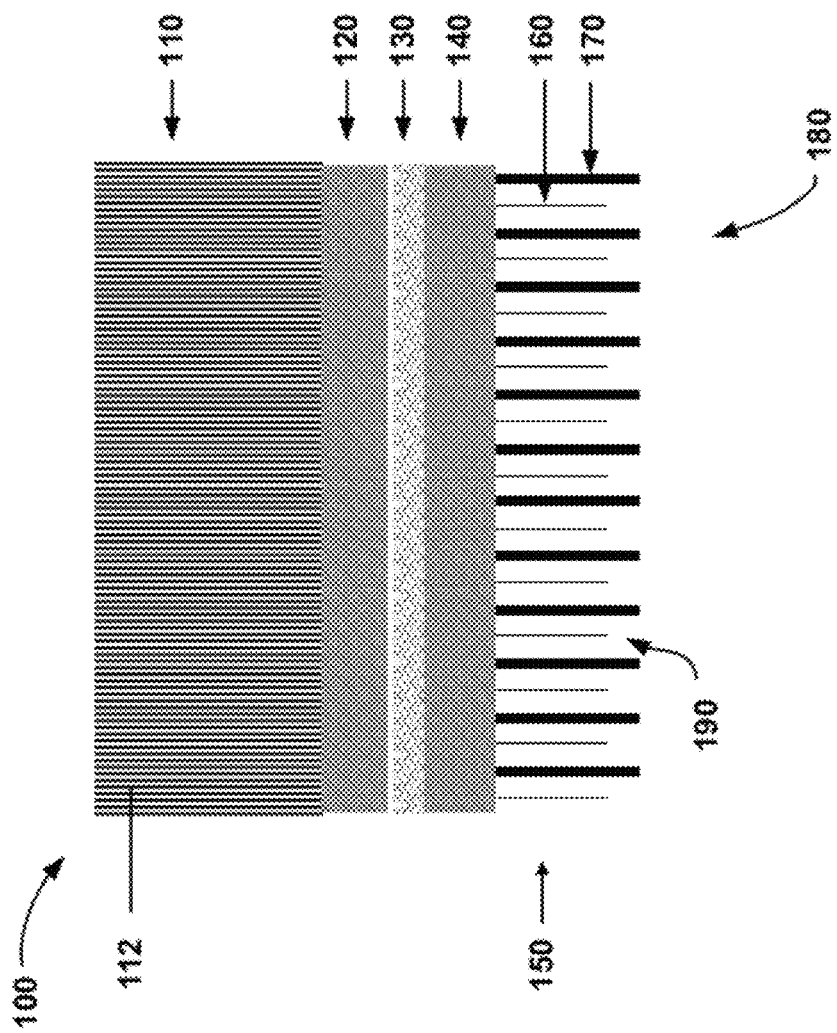
FIG. 2 is another illustration of the textile structure according to the present disclosure.

Secondary backing layer 150 may be exposed to a heat source, such as infrared lamps prior to being attached to the remainder of textile structure 100. As shown in FIG. 2, the applied heat may cause the finer denier fibers 160 to draw closer (such as by shrinking, curling or otherwise deforming) and collapse towards the base of the felt. In doing so, the overall length of the fibers 160 may shorten thus further exposing the heavier denier fibers 170 at bottom surface 180 and create empty pockets 190 between the heavier denier fibers 170. Fibers 160 may have a pile height in a range of and all increments between 1 mm to 8 mm (e.g. 1 mm), while fibers 170 may have a pile height in a range of and all increments between 2 mm to 10 mm (e.g. 4 mm).

Once treated with heat, secondary backing layer 150 may be attached to the remainder of textile structure 100 which is coated with latex 130 using polyethylene, polypropylene or other like polymers that will provide an adhesive layer 140.

Figure 3:
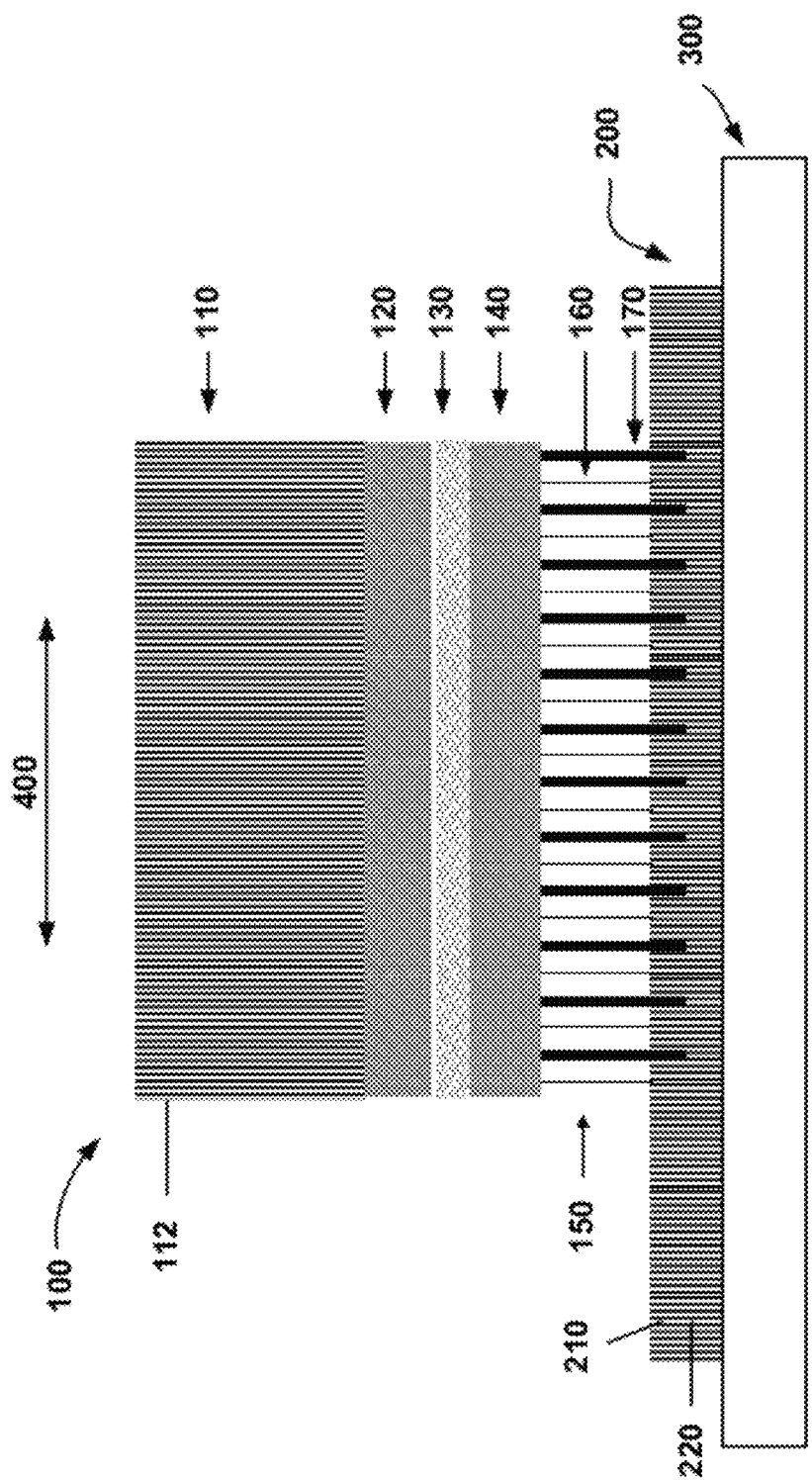
FIG. 3 is an illustration of the textile structure being used as an automotive floor mat overlying and interior carpet of a motor vehicle.

As shown in FIG. 3, textile structure 100 may be used to provide a covering to overlie an interior floor 300 of a motor vehicle. For example, textile structure 100 may be used as an automotive (accessory) mat, such as a floor mat for the passenger area (e.g. front passenger or rear passenger floor mat) and/or the cargo area of a motor vehicle (e.g. trunk or other storage area), and may overlie the interior carpet 200 (woven or non-woven) of a motor vehicle which overlies a floor pan 300, particularly in areas of the carpet prone to high wear, to better inhibit wear of those carpeted areas.

In addition, textile, structure 100, when used as an automotive floor mat, may inhibit the floor mat from sliding or otherwise moving out of its desired predetermined position when a shear load is applied to the surface of the floor mat. In other words, a transitional load which creates shear stress and/or translational movement between the automotive floor mat and the carpet.

When tested in accordance with certain automotive specifications, textile structure 100 may provide an increased coefficient of friction between an overlying floor mat and the underlying carpet as compared to a floor mat without a secondary backing 150 comprising fibers 160 and 170 having two different deniers. In the foregoing manner, with the increased coefficient of friction, the slip or slide resistance between the textile structure 100 and the underlying carpet 200 may be correspondingly increased.

More particularly, textile structure 100 may be tested in accordance with a modified version of ASTM D1894-08, Static and Kinetic Coefficients of Friction of Plastics Film and sheeting, which is one test which may be used to quantify coefficient of friction. The test is to simulate an accessory mat, which lies on a floor carpet and then is forced to move by pushing it with a simulated shoe heel. A force is developed until the sample reaches a maximum breakaway force and starts to move. The static coefficient of friction may be understood as the ratio of the force required to move one surface over another to the total force applied normal to those surfaces, at the instant motion starts.

The coefficient of Friction is calculated as a unitless value using the formula u=A/B, where A=the initial motion scale reading maximum load (N) and B=sled weight (0.5 kilograms+mat sample weight)×9.81 meters/second.

Without being bound to a particular theory, the recessed fibers 160 relative to the length of fibers 170 may be understood to create a surface 180 of staggered fiber lengths 160, 170, with the recessed fibers 160 creating pockets 190 between the fibers 170. When surface 180 is placed over an opposing textile surface 210 of carpet 200, the fibers 220 of carpet 200 may enter the recessed areas or pockets 190, while heavier denier fibers 170 of textile structure 100 may penetrate into carpet 200. As a result, a mechanical engagement may be created between textile structure 100 and carpet 200 which may inhibit lateral movement in directions 400 of textile structure 100 relative to carpet 200 whereby the coefficient of friction between the textile structure 100 and carpet 200 may also increase. The mechanical engagement may provide increased resistance to lateral movement in directions 400 of textile structure 100 relative to carpet 200 as compared to alternative mats.

Thus, in the foregoing manner, a method of providing a slip resistant covering to overlie a floor pan carpet of a motor vehicle comprising overlying the carpet with an accessory mat having an underlying backing comprising at least a first plurality of fibers and a second plurality of fibers, wherein the first plurality of fibers have a first fiber denier and the second plurality of fibers have a second fiber denier different than the first fiber denier, and wherein the underlying backing of the accessory mat is configured to be in direct contact with the floor pan carpet may be provided.

What is claimed is:

1. A textile structure comprising:
an upper layer;
a primary backing underlying the upper layer;
a secondary backing underlying the primary backing, wherein the secondary backing comprises at least a first plurality of fibers and a second plurality of fibers;
wherein the first plurality of fibers have a first fiber denier and the second plurality of fibers have a second fiber denier, wherein the first fiber denier is less than the second fiber denier; and
wherein the first plurality of fibers have a have a first fiber pile height and the second plurality of fibers have a second fiber pile height, wherein the first fiber pile height is less than the second fiber pile height; and
wherein the first fiber pile height and the second fiber pile height are arranged to provide a bottom surface of the secondary backing with staggered pile lengths with the first fiber pile height recessed relative to the second fiber pile height.

2. The structure of claim 1 wherein:
the first fiber denier is in a range of 2 to 40 denier; and
the second fiber denier is in a range of 30 to 500 denier.

3. The structure of claim 1 wherein:
at least one of the first plurality of fibers and the second plurality of fibers have a fiber length in a range of 10 mm to 100 mm.

4. The structure of claim 1 wherein:
the first plurality of fibers provide between 20% to 70% by weight of a total fibers of the secondary backing; and
the second plurality of fibers provide between 30% to 80% by weight of the total fibers of the secondary backing.

5. The structure of claim 1 wherein:
the secondary backing has a weight between 4 oz/yd2 to 30 oz/yd2.

6. The structure of claim 1 wherein:
the secondary backing is a non-woven backing.

7. The textile structure of claim 1 wherein:
the secondary backing is a felt backing.

8. A covering to overlie an interior floor of a motor vehicle, comprising:
an accessory mat, wherein the mat has an underlying backing comprising at least a first plurality of fibers and a second plurality of fibers, wherein the first plurality of fibers have a first fiber denier and the second plurality of fibers have a second fiber denier, wherein the first fiber denier is less than the second fiber denier; and
wherein the first plurality of fibers have a have a first fiber pile height and the second plurality of fibers have a second fiber pile height, wherein the first fiber pile height is less than the second fiber pile height;
wherein the underlying backing has a bottom surface; and
wherein the first fiber pile height and the second fiber pile height are arranged to provide a bottom surface of the underlying backing with staggered pile lengths with the first fiber pile height recessed relative to the second fiber pile height.

9. The covering of claim 8 wherein:
the first fiber denier is in a range of 2 to 40 denier; and
the second fiber denier is in a range of 30 to 500 denier.

10. The covering of claim 8 wherein:
at least one of the first plurality of fibers and the second plurality of fibers have a fiber length in a range of 10 mm to 100 mm.

11. The covering of claim 8 wherein:
the first plurality of fibers provide between 20% to 70% by weight of a total fibers of the underlying backing; and the second plurality of fibers provide between 30% to 80% by weight of the total fibers of the underlying backing.

12. The covering of claim 8 wherein:
the underlying backing has a weight between 4 oz/yd2 to 30 oz/yd2.

13. The covering of claim 8 wherein:
the underlying backing is a non-woven backing.

14. The covering of claim 8 wherein:
the underlying backing is a felt backing.

\* \* \* \* \*